United States Patent [19]

Dettling et al.

[11] Patent Number: 5,128,306
[45] Date of Patent: Jul. 7, 1992

[54] PALLADIUM CONTAINING CERIA-SUPPORTED PLATINUM CATALYST AND CATALYST ASSEMBLY INCLUDING THE SAME

[75] Inventors: Joseph C. Dettling, Howell; Yiu-Kwan Lui, Parlin, both of N.J.

[73] Assignee: Engelhard Corporation, Iselin, N.J.

[21] Appl. No.: 541,452

[22] Filed: Jun. 21, 1990

Related U.S. Application Data

[63] Continuation of Ser. No. 341,606, Apr. 20, 1989, abandoned.

[51] Int. Cl.⁵ .................. B01J 21/04; B01J 23/10; B01J 23/42; B01J 23/44
[52] U.S. Cl. .................. 502/304; 423/213.5
[58] Field of Search .............. 502/304; 423/213.5, 423/213.7

[56] References Cited

U.S. PATENT DOCUMENTS

| | | | |
|---|---|---|---|
| 4,299,734 | 11/1981 | Fujitani et al. | 502/304 |
| 4,587,231 | 5/1986 | Sawamura et al. | 502/304 |
| 4,708,946 | 11/1987 | Ohata et al. | 502/304 |
| 4,714,694 | 12/1987 | Wan et al. | 502/333 X |
| 4,727,052 | 2/1988 | Wan et al. | 502/333 X |

Primary Examiner—W. J. Shine

[57] ABSTRACT

A catalyst composition includes a catalytic material containing a platinum catalytic component dispersed on a bulk ceria and a palladium catalytic component; the palladium catalytic component may be dispersed either on the ceria or on another support, such as an activated alumina support. The catalytic material, which may include a refractory binder, such as alumina, may be dispersed as a washcoat on a suitable carrier, e.g., a cordierite honeycomb-type carrier having a plurality of fine gas flow passages extending therethrough. The bulk ceria may be stabilized with a zirconia stabilizer and/or a lanthana stabilizer. The catalyst composition has utility as an oxidation catalyst and as a three-way conversion catalyst. In the latter case, its activity for the reduction of nitrogen oxides may optionally be supplemented either by adding a rhodium-containing catalytic overcoat or by providing a catalyst assembly in which the above-described catalyst composition is placed in series with any suitable nitrogen oxides reduction catalyst.

22 Claims, No Drawings

PALLADIUM CONTAINING CERIA-SUPPORTED PLATINUM CATALYST AND CATALYST ASSEMBLY INCLUDING THE SAME

This is a continuation of copending application Ser. No. 07/341,606 filed on Apr. 20, 1989, abandoned.

BACKGROUND OF THE INVENTION

1. Field of The Invention

The present invention is concerned with catalyst useful for the treatment of gases to reduce contaminants contained therein. More specifically, the present invention concerned with improved catalysts which may function as oxidation catalysts and/or as catalysts of the type generally referred to as "three-way conversion" or "TWC" catalysts. Whereas oxidation catalysts have the capability of catalyzing reactions such as the oxidation of hydrocarbons and carbon monoxide, TWC catalysts are polyfunctional in that they have the capability of substantially simultaneously catalyzing both oxidation and reduction reactions, such as the oxidation of hydrocarbons and carbon monoxide and the reduction of nitrogen oxides. Both types of catalyst find utility in a number of fields, including the treatment of the exhaust gases from internal combustion engines, such as automobile and other gasoline-fueled engines.

2. Background and Related Art

Emissions standards for unburned hydrocarbons, carbon monoxide and nitrogen oxide contaminants in vehicle and other engine exhaust gases have been set by various governments and agencies. In order to meet such standards, so-called catalytic converters containing separate oxidation catalysts or separate oxidation and reduction catalysts, or a TWC catalyst, are emplaced in the exhaust gas line of internal combustion engines to promote the oxidation of unburned hydrocarbons ("HC") and carbon monoxide ("CO") and the reduction of nitrogen oxides ("$NO_x$") in the exhaust gas. If the engine operation is too rich in fuel to inherently provide sufficient oxygen in the exhaust gas to oxidize HC and NO, it is known to introduce oxygen into the exhaust gas as required. The known use of two separate catalyst beds in series, one to promote oxidation of HC and CO and the other to promote reduction of $NO_x$, can be replaced by a single bed catalyst which substantially simultaneously promotes both oxidation and reduction as described above. However, such TWC catalysts usually require that the ratio of air to fuel ("A/F ratio") introduced into the engine whose exhaust gas is being treated be at, or within a narrow deviation from, the stoichiometric A/F ratio in order to achieve good efficiencies of conversion of all three classes of pollutants, i.e., HC, CO and $NO_x$ to innocuous substances, that is, to carbon dioxide, water and nitrogen.

A great deal of effort has been expended in an attempt to economically produce oxidation catalysts and TWC catalysts which exhibit good activity and long life in promoting the conversion of the HC and CO pollutants (oxidation catalysts) and the HC, CO and $NO_x$ pollutants (TWC catalysts) even when the pollutants are contained in very small quantities in the gas stream being treated. For this purpose, catalysts comprising one or more platinum group metals distended upon a high surface area, refractory oxide support are well known in the art. The support may comprise a high surface area alumina coating carried on a carrier such as a monolithic carrier comprising a refractory ceramic or metal honeycomb structure, as well known in the art. The carrier may also comprise refractory particles such as spheres or short, extruded segments of a refractory material such as alumina.

Thus, typical catalyst compositions comprise a minor amount of platinum or palladium, preferably including one or more of rhodium, ruthenium and iridium, especially rhodium, as a platinum group metal component dispersed on a high surface area alumina material. The catalytic activity of the material is enhanced by dispersing the catalytically active platinum group metal components on a very high surface area support layer. The catalytically active materials dispersed on the activated alumina may also contain one or more base metal oxides, such as oxides of nickel, cobalt, manganese, iron, rhenium, etc., as shown, for example, in O. D. Keith et al U.S. Pat. No. 4,552,732, Such high surface area alumina materials, loosely referred to in the art as "gamma alumina" or "activated alumina", typically exhibit a BET surface area in excess of 60 square meters per gram ("$m^2/g$"), often up to about 200 $m^2/g$ or more. Such activated alumina is usually a mixture of the gamma and delta phases of alumina, but may also contain substantial amounts of eta, kappa and theta alumina phases.

A common deficiency associated with supported catalyst systems is thermal degradation of the catalyst refractory oxide support from extended exposure to high exhaust gas temperatures of the automotive or other internal combustion engine. In a moving vehicle, for example, exhaust temperatures can reach 1000° C., and such elevated temperatures cause the support material to undergo a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or, most usually, rare earth metal oxides, for example, ceria, lanthana and mixtures of two or more rare earth metal oxides. For example, see C. D. Keith et al U.S. Pat. No. 4,171,288.

Nonetheless, thermal degradation of the alumina support is a problem which adversely affects the performance and durability of TWC and oxidation catalysts and which is exacerbated by the use of high A/F ratios, often employed in automobile engines, which cause increased oxygen concentrations in the exhaust gases. The use of high A/F ratios improves the fuel economy of automobile engines, but the presence of excess oxygen in the exhaust, referred to in the art as a "lean exhaust", reduces the activity of platinum group metal catalysts, as platinum dispersed on activated alumina support is more readily sintered at elevated temperatures in a lean exhaust atmosphere, thus reducing the available metal surface area of the catalyst.

It is known that bulk cerium oxide (ceria) provides an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. For example, see U.S. Pat. No. 7,714,694 of C. Z. Wan et al. which discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, optionally, an aluminum-stabilized bulk ceria as disclosed in aforesaid U.S. Pat. No. 4,714,694, is also disclosed in U.S. Pat. No. 4,727,052 of C. Z. Wan et al. Each of the aforesaid C. D. Keith and C. Z. Wan et al U.S. Patents are also assigned to the assignee of this application.

U.S. Pat. No. 4,708,946 of Ohata et al discloses a three-way conversion catalyst comprising a monolithic honeycomb carrier on which is deposited an alumina-modified cerium oxide material and at least one precious metal selected from the group consisting of platinum, palladium and rhodium, together with activated alumina. The cerium oxide material is obtained by impregnating a water-insoluble cerium compound, such as cerium oxide, cerium hydroxide or cerium carbonate, in finely divided particle form with a water-soluble aluminum compound and/or aluminum hydrates, for example, alumina nitrate (see column g, lines 36-53). The impregnated cerium compound is dried and then calcined in air at a temperature in the range of 300° to 700° C. to provide an alumina-modified cerium oxide. As disclosed at column 3, line 51 through column 4, line 9, the alumina-modified cerium oxide may have dispersed thereon at least one precious metal selected from the group consisting of platinum and palladium and mag contain active alumina on which rhodium may be dispersed.

U.S Pat. No. 4,299,734 of Fugitani et al discloses a three-wag conversion catalyst comprising platinum and palladium or mixtures thereof supported on a porous zirconia carrier which contains, per liter of carrier, from about 1 to 80 grams of at least one of cerium oxide, manganese oxide and iron oxide (column 1, lines 49-57 and column 2, lines 17-24). At column 2, lines 39-64, impregnation of the zirconia carrier with a solution of a salt of cerium, manganese or iron is disclosed as one technique for making the catalyst. At lines 57Γof column 2, an alternate manufacturing technique is disclosed in which a zirconia powder is mixed with an oxide powder containing at least one of cerium oxide, manganese oxide or iron oxide powder, and the mixed powders are sintered. When sintering the mixed zirconia and oxide powders (e.g., cerium oxide powder), about 1 to 5 percent by weight of alumina is added as a binder (column 2, line 65 to column 3, line 2).

Both platinum and palladium catalytic components are included on a ceria-impregnated zirconia carrier in the catalyst denominated A7 in Table 2 of the Fujitani Patent.

SUMMARY OF THE INVENTION

In accordance with the present invention, there is provided a catalyst composition comprised of a carrier on which is disposed a catalytic material. The catalytic material comprises the following components. A bulk ceria support, optionally containing one or both of a zirconia stabilizer, and a lanthana stabilizer, a catalytically effective amount of a platinum catalytic component dispersed on the ceria support, a catalytically effective amount of a palladium catalytic component, and a refractory binder, for example, an alumina refractory binder. The platinum and the palladium catalytic components are present in quantities to provide in the catalytic material a platinum to palladium weight ratio of from about 50:1 to 1:50, measured as the metals. The total weight of the platinum and palladium catalytic components, measured as the metals, may comprise from about 0.1 to 3.0 percent by weight of the total weight of the catalytic material.

Yet another aspect of the present invention provides for a catalyst composition as above in which the palladium catalytic component is also dispersed on the ceria support. For example, in an aspect of the present invention, both the platinum and the palladium catalytic components are dispersed on the same increments of the bulk ceria. e.g., on the same individual particles of bulk ceria.

In still another aspect of the present invention, at least a portion of the refractory binder is provided by an activated alumina support on which either the palladium catalytic component, or a rhodium catalytic component, or both, is dispersed.

Another aspect of the present invention provides a catalyst composition comprising a carrier on which is carried a catalytic material comprising the following components. A bulk ceria support containing one or both of a zirconia stabilizing promoter and a lanthana stabilizer, a catalytically effective amount of one or more catalytic metal components dispersed on the ceria support, and a refractory binder.

In accordance with another aspect of the present invention, there is provided a catalyst assembly which is suitable for treating a gaseous stream containing both oxidizeable and reducible gaseous pollutants. The catalyst assembly comprises a first catalyst composition as described above, (the carrier thereof begin referred to as a first carrier) and a second catalyst composition including a second carrier comprising a catalyst effective for the reduction of nitrogen oxides. The catalyst assembly is completed by an enclosure means within which the first catalyst composition and the second catalyst composition are mounted to provide for series flow of a gaseous stream through the first and second catalyst compositions for catalytic treatment of the gaseous stream.

As used herein and in the claims, reference to the platinum and the palladium catalytic components being dispersed on "the same increments of bulk ceria" simply means that both catalytic components are dispersed on the same bulk ceria particles. The bulk ceria particles may then be formed (with the help of a refractory binder) into an adherent coating on the carrier. The defined term distinguishes from the situation in which a first batch of ceria particles has the platinum catalytic component dispersed thereon and a second batch of ceria particles has the palladium catalytic component thereon, after which the particles mag be mixed and applied as a coating to a suitable carrier. In the latter case, the platinum and the palladium catalytic compoare not dispersed on "the same increments of bulk ceria" as that phrase is used herein and in the claims.

As described elsewhere herein, the zirconia and lanthana appear to serve as catalytic promoters as well as thermal stabilizers for the ceria. Accordingly, the zirconia and lanthana are sometimes referred to in the specification as comprising a "stabilizing promoter", and are sometimes referred to simply as a "stabilizer" or a "promoter", the three terms being used, both in the singular and plural forms, interchangably in the specification. However inasmuch as their primary function is believed to be to stabilize the bulk ceria against thermal degradation, the zirconia and lanthana materials are referred to in the claims simply as a "stabilizer".

DETAILED DESCRIPTION OF THE INVENTION AND SPECIFIC EMBODIMENTS THEREOF

The dispersal of a platinum catalytic component on bulk ceria has been found to provide a much more active catalyst than the dispersion of platinum on activated alumina; the increased activity is believed to be due to the interaction of the platinum metal with the ceria support, which maintains the platinum dispersed on the support in the form of very small crystallites, which are smaller than the platinum crystallites resulting from dispersing platinum on activated alumina.

In many catalytic applications, including use of the catalyst as an oxidation or a TWC catalyst to treat exhaust gases of internal combustion engines, the catalyst is subjected to high temperatures, for example, to temperatures of 700° or 800° C. or more. Unstabilized ceria tends to thermally degrade at temperatures of about 600° C. to 700° C., sustaining a sharp reduction in surface area and collapse of the oxide surface so as to occlude the catalytic metals dispersed thereon. Accordingly, it is desirable that the ceria should be stabilized against thermal degradation. As indicated above, aluminum-stabilized ceria is known as disclosed in the aforesaid U.S. Pat. Nos. 4,714,694 and 4,708,946. However, the resultant alumina (or other aluminum compound) stabilizer for the bulk ceria tends to coat the ceria particles and interferes with the fine dispersion of the platinum catalyst metal on the ceria support. Generally, platinum dispersed on activated alumina tends to agglomerate in fewer but larger crystallites of platinum than is the case with platinum dispersed on bulk ceria.

It has been discovered that if a zirconia stabilizing promoter is used to stabilize the ceria, the zirconia stabilizing promoter, unlike the aluminum stabilizer, does not interfere with the fine dispersion of platinum crystallites on the support. Without wishing to be bound by any particular theory, it is believed that the zirconia stabilizing promoter forms "islands" of zirconia (or some other zirconium compound) on the ceria particles, leaving ample zirconiafree areas in which the fine platinum crystallites adhere directly to the ceria particles. This is in contrast to an aluminum-stabilized bulk ceria, because the resultant stabilizing alumina (or other aluminum compound) tends to coat the entire surface of the ceria particles, thereby losing the advantageous dispersion of small platinum crystallites which is attainable when the platinum is dispersed directly onto those portions of the surface which are substantially free of stabilizer. A lanthanum stabilizer provides the same type of advantage as does the zirconium stabilizer.

Although the ceria provides an excellent support with regard to a high degree of dispersion of small platinum crystallites thereon, the catalytic activity of catalysts not containing a catalytically effective amount of palladium and in which platinum is dispersed directly onto the ceria, was found to rather quickly deteriorate after the catalysts had been placed in use. Again, without wishing to be bound by any particular theory, it is believed that the platinum metal interacts with the ceria to form a Pt-CeOx complex, in which the platinum forms a pseudo-oxide which is only difficultly reducible. Accordingly, the platinum is trapped in the Pt-CeOx complex and its catalytic efficacy is thereby reduced or eliminated. It was found that the inclusion of a more readily reducible catalytic component in combination with the platinum facilitated reduction of the pseudo-platinum oxide to platinum metal, thereby restoring the platinum to elemental form and maintaining its catalytic efficacy. Palladium provides such a more readily reducible oxide or pseudo-oxide: it is believed that the reduction of the palladium oxide or palladium pseudo-oxide of a Pd-CeOx complex facilitates the reduction of the platinum pseudo-oxide to elemental platinum.

Thus, by utilizing a zirconia stabilizing promoter and/or a lanthana stabilizing promoter for the bulk ceria to enhance its thermal stability, the dispersion of fine, platinum crystallites on the stabilized cerium oxide support is attained, and by including palladium along with platinum as the catalytic components, good durability, that is, a long duration of catalyst life, is attained. One embodiment of the catalyst of the present invention thus provides a catalytic material comprising: a bulk ceria support which has been treated with a zirconia stabilizing promoter and/or a lanthana stabilizing promoter; a platinum catalytic component dispersed on the bulk ceria support: and a palladium catalytic component dispersed on a suitable support, such as alumina or the stabilized bulk ceria.

Generally, three different approaches may be taken to dispersing the catalytic components onto support materials, as follows. (1) The platinum catalytic component may be dispersed on a first batch of ceria particles and the palladium catalytic component may be dispersed on a second batch of ceria particles, with the two batches of catalytic component-containing ceria particles mixed to provide a material comprising platinum and palladium catalytic components dispersed on a ceria support. (2) Alternatively, the same hatch of ceria particles may have both the platinum and palladium catalytic components dispersed thereon so that the same individual particles ("the same increments of bulk ceria") contain both platinum and palladium catalytic components, (3) Another alternative is to disperse the platinum catalytic component on ceria particles and disperse all or part of the palladium catalytic component on a different support, e.g.. on a support comprising particles of activated alumina, and then mix the platinum catalytic component-containing ceria and the palladium catalytic component-containing alumina particles to provide a material comprising platinum and palladium catalytic components on a heterogeneous mixed support material. Optionally, the ceria may also contain some of the palladium catalytic component.

Generally, alternative (2) above is preferred in some respects because it brings the palladium catalytic component into more intimate contact with the platinum catalytic component, as well as somewhat simplifying the manufacturing procedure. The activated alumina, as well as the bulk ceria, is stabilized against thermal degradation. The material resulting from the above-described approaches (1), (2) or (3) may be dispersed, together with a refractory binder such as activated alumina, as a catalytic material coating on a suitable carrier, such as a cordierite carrier comprising a monolithic body having a plurality of fine, parallel gas flow channels extending therethrough. Bulk ceria does not adhere well to materials such as cordierite or other conventionally employed carrier materials and fine particles of activated alumina or other suitable refractory binders are added to the ceria, to bind it in an adherent coating to the carrier. The walls of the gas flow channels are coated with the resultant catalytic coating, which is sometimes referred to as a "washcoat", so that a gas to be treated may be flowed through the channels in contact with the coating. The catalytic material coating or washcoat may contain from about 10 to 75 weight percent of ceria as $CeO_2$, thermally stabilized with about 0.5 to 10 weight percent of zirconia stabilizing promoter (calculated as $ZrO_2$ and based on the weight of $ZrO_2$ plus $CeO_2$) and/or from about 0.5 to 10 weight percent of lanthana stabilizing promoter (calculated as $La_2O_3$ and $CeO_2$ and based on the weight of $La_2O_3$ plus $CeO_2$) from about 0.1 to 3.0 percent by weight of platinum catalytic component, and from about 0.1 to 3.0 percent by weight of palladium catalytic component, the platinum and palladium catalytic components being calculated as the metals.

Optionally, other catalytic components may be included in the above composition. For example, especially for use in TWC catalysts, it may be desirable to have a proportion of the total platinum metal content of the catalyst present in the form of the larger crystallites in which platinum tends to aggregate on activated alumina supports. It is believed that such larger crystallites may, under certain operating conditions, be more effective than the smaller platinum crystallites associated with ceria in promoting the conversion of hydrocarbons to $CO_2$ and $H_2O$. Accordingly, a catalyst composition as described above, for example, one comprising platinum and palladium catalytic components dispersed on ceria containing a zirconia stabilizing promoter may be combined with an alumina support containing a platinum catalytic component thereon and, optionally, other catalytic components dispersed thereon. The ceria and the alumina support particles having their respective catalytic components dispersed thereon may be combined to form a washcoat which is then applied to the carrier. The platinum (or other) catalytic component-containing alumina particles may serve as a refractory binder, thereby reducing or eliminating the need to include a separate refractory binder (such as activated alumina particles with no catalytic component thereon) in the material. For example, if it is desired to include rhodium as a catalytic component in the composition, the rhodium should be dispersed on an alumina support and not on a ceria support because of the known disadvantageous interaction which occurs when rhodium is directly dispersed on a ceria support when exposed to high temperature lean conditions. Thus, platinum and palladium dispersed on ceria particles containing a zirconia stabilizing promoter and/or a lanthana stabilizing promoter may be combined with alumina particles on which are dispersed rhodium and, optionally, other catalytic components such as platinum. Non-platinum group metal catalytic components, such as base metal oxides, may also be included in the catalyst material. e.g., by being present in bulk form or dispersed on either the ceria or alumina support particles or both. For example, base metal oxides comprising oxides of one or more of nickel, cobalt, manganese, iron, rhenium, zinc and other polyvalent base metals may, as is known in the art, be utilized in combination with one or more platinum group metal catalytic components.

The preparation of catalysts in accordance with the present invention, and a demonstration of their efficacy, is shown by the following examples. In the following examples, all references to the percentage of a component of a combination means, unless otherwise specified, the percent by weight of the total weight of the combination ascribed to this component. Further, when the percent or percent by weight to a component is indicated by utilizing the chemical symbol or chemical formula for the component, it means that the component is measured as the element or compound described by the symbol or formula. Thus, "0.5% Pt" with reference to the platinum catalytic component means 0.5 percent by weight thereof, measured as the elemental metal. Similarly, "2.5% $ZrO_2$" with reference to the zirconia stabilizing promoter, means 2.5 percent by weight measured as $ZrO_2$.

It should be noted that honeycomb-type substrates, such as the cordierite substrates described in some of the examples, comprise bodies having a plurality of fine, parallel gas glow passages extending therethrough. Such substrates are usually described with reference to the number of such channels, sometimes referred to as "cells", per unit area of the face area of the substrate, for example, 400 cells (gas flow channels) per square inch of face area. The actual cross-sectional dimensions of the cells will of course depend on the thickness of the walls defining the cells but, generally, the substrates are made with walls as thin as possible consistent with adequate mechanical strength of the body in order to maximize the gas flow area. The catalytic material is applied as a slurry to the substrate to coat the walls defining the gas flow channels, the dried, calcined residue of the slurry being referred to as a "washcoat". The result is a catalyst body or unit comprising the honeycomb-like substrate having a washcoat adhered thereto. The amount of washcoat, as well as the amount of the components of the washcoat, are given in unit weight per unit volume of the catalyst body or unit. Conventionally, the quantity of washcoat is described in grams of washcoat per cubic inch of volume of the catalyst body and the much smaller quantities of the precious metal catalytic components are typically described in grams of the elemental metal per cubic foot of volume of the catalyst body. The volume of the catalyst body is its actual physical volume and therefore includes the volume of the voids provided by the gas flow channels as well as the washcoat and the walls to which the washcoat is adhered.

EXAMPLE 1

A high surface area (160 to 180 $m^2/g$) cerium oxide powder of high purity (99.9 weight percent $CeO_2$) was divided into three batches. The ceria powder had a particle size such that at least 50% of the particles had a diameter of not more than 7.5 microns. One batch of stabilized ceria was prepared by impregnating the first batch of the ceria powder with an aqueous solution of zirconyl nitrate hydrate. A second batch of stabilized ceria powder was prepared by impregnating the second batch of the ceria powder with an aqueous solution of lanthanum nitrate hydrate. In each case, sufficient solution was added to the ceria powder to wet the powder and provide a slight excess of the solution; the wetted ceria powder was stirred for 15 minutes to ensure good contacting of the powder by the solution. The stirred, wetted powders were dried at 110° C. for a minimum of 2 hours in order to remove unbound water from the powders. The dried powders were then separately ground to crush any agglomerated particles, and each was calcined for 2 hours at 450° C. in air in a muffle furnace to decompose the respective lanthanum and ziroonium salts to the oxide form. The resulting zirconia and lanthana contents of the stabilized ceria powders after calcining were 2.5% by weight of the total weight of the calcined, impregnated powders, measured as $ZrO_2$ and $La_2O_3$, respectively. The third batch of ceria powder was left untreated.

Each of the three batches was divided into four samples. Each of the twelve resulting samples was heated for two hours in air at the temperatures indicated in TABLE 1 below. After this aging treatment, each of the samples was measured for BET surface area using a standard nitrogen adsorption method. The results of the measurements indicate that at least at temperatures of about 750° C. or higher, both zirconia and lanthana effectively stabilized the surface area of the ceria powder, as compared to the unstabilized samples.

TABLE 1

| | Surface Area ($m^2/g$) | | |
| --- | --- | --- | --- |
| | | $CeO_2$ Stabilized With | |
| Temp. °C. | Untreated $CeO_2$ | $ZrO_2$ | $La_2O_3$ |
| 450 | 175 | 141 | 149 |
| 650 | 89 | 76 | 37 |
| 750 | 25 | 46 | 37 |
| 850 | 9 | 21 | 16 |

The lower surface areas of the stabilized ceria powders as compared to that of the untreated ceria powder under moderate aging conditions below about 750° C. is due to the fact that the stabilizer oxides have lower surface areas than the ceria powder used. Because ceria starts to lose significant surface area at about 600° C. or so, the difference in surface area between the unstabilized and stabilized ceria powders is less after aging at 650° C. than it was after aging at 450° C.; after aging at 750° C., the stabilized ceria powders show a higher surface area than the unstabilized powder, due to the stabilizing effect of lanthana and zirconia on the ceria.

EXAMPLE 2

Three batches of stabilized ceria powder were prepared, a zirconia-stabilized ceria powder a lanthana-stabilized ceria powder, and an alumina-stabilized ceria powder. The zirconia-stabilized ceria powder and the lanthana-stabilized ceria powder were prepared as in Example 1. The alumina-stabilized ceria powder was prepared by using the same ceria powder as described in Example 1, and impregnating it with a solution of hydrated aluminum nitrate, following the procedure described in Example 1 for the zirconia and lanthana stabilizers. The three batches of stabilized ceria powders and a fourth, untreated batch of the same ceria powder as used in Example 1 were then impregnated with a platinum catalytic component by separately impregnating each of the four powders with an aqueous solution of monoethanolamine platinum hydroxide complex. In each case, the powders were wetted to incipient wetness and thoroughly mixed to ensure good contacting of the platinum compound with the powder. The resulting powders were each dried at 110° C. to remove unbound water and then calcined for 2 hours at 450° C. in air to provide four different ceria powders, three stabilized and one unstabilized, and each containing 1.6 percent by weight of platinum catalytic component, measured as Pt. The four samples were each aged by being heated for two hours in air at 750° C. The BET surface areas of the resulting powders were measured using the same technique as used in Example 1, and the results are as shown in TABLE 2.

TABLE 2

| Stabilizer | % By Weight Stabilizer | Surface Area ($m^2/g$) |
| --- | --- | --- |
| None | 0 | 67 |
| $Al_2O_3$ | 2.5 | 67 |
| $ZrO_2$ | 2.5 | 80 |
| $La_2O_3$ | 2.5 | 75 |

The results of TABLE 2 show that the zirconia- and lanthana-stabilized ceria maintains its surface area markedly better than either the unstabilized ceria or the alumina-stabilized ceria. These results are particularly interesting when it is realized that the platinum catalytic component itself is a good stabilizer for ceria. Of course, the platinum is incorporated for its catalytic effect and is much too expensive to use simply as a thermal degradation stabilizer. The results of TABLE 2 show that the platinum provided the same stabilization effect as the alumina stabilizer; the results are consistent with the hypothesis that alumina, by coating the entire surface of the ceria particle, reduces the fineness of the dispersion of the platinum catalytic component onto the ceria particle, thereby reducing the inherent thermal stabilization effect of the platinum on the ceria. More significantly, the interference of alumina with the fine dispersion of the platinum is believed to also reduce the catalytic efficiency of the platinum, at least with respect to oxidation of carbon monoxide. In contrast, the zirconia- and lanthana-stabilizing promoters, as discussed above, are believed to form "islands" of zirconia and/or lanthana on the ceria particle, leaving the remainder of the surface of the ceria particles available for direct access and consequent dispersion as fine crystallites by the platinum catalytic component.

EXAMPLE 3

A. A 2.5 percent zirconia-stabilized ceria powder was prepared as in Example 1. An aqueous solution of a complex of monoethanolamine palladium acetate was impregnated into the stabilized ceria powder using the same technique described in Example 1. After thorough mixing to ensure good contacting of the palladium complex solution with the ceria powder, the powder was dried at 110° C. to remove unbound water and provide a stabilized ceria powder having dispersed thereon 0.1 percent by weight of a palladium catalytic component, measured as Pd.

The above impregnation and drying procedure was repeated on the dried material with an aqueous solution of a platinum monoethanolamine complex to provide 1 percent by weight of the platinum catalytic component, measured as Pt dispersed on the ceria powder. The resulting dried powder was calcined in air at 450° C. for two hours. Thus, the finished material contained 0.1 percent by weight Pd and 1 percent by weight Pt.

B. Step A was repeated on another batch of the same ceria powder in order to provide a zirconia-stabilized ceria containing 0.5 percent by weight of the platinum catalytic component and 1 percent by weight of the palladium catalytic component, each measured as the elemental metal.

C. The procedure of Step B was carried out on another, and unstabilized, batch of the same ceria powder in order to provide an unstabilized ceria powder containing 1 percent by weight of a platinum catalytic component dispersed thereon, measured as Pt.

D. The procedure of Step C was carried out on a batch of gamma alumina particles having a surface area of 150 m$^2$/g and a particle size such that at least 50 percent by weight of the alumina particles had a diameter of not greater than 15 microns, in order to provide an unstabilized alumina powder having 1 percent by weight of a platinum catalytic component dispersed thereon, measured as Pt.

E. The materials obtained in Steps A, B, C, D and E were each aged in a tube reactor with a gas containing 2g SO$_2$ in air for 30 minutes at 450° C. This aging treatment was followed by a reducing treatment in which hydrogen at a temperature of 400° C. was glowed through the material for 30 minutes to activate the samples from the effects of the sulfur. The samples were then evaluated for CO oxidation activity by flowing 2% CO in He at 40 milliliters per minute ("ml/min.") and 2% O$_2$ in He at 20 ml/min. over a 0.1g sample in a quartz reactor tube in a furnace being heated at a rate of 2.5° C. per minute. Analysis was conducted using a thermal conductivity cell gas chromatograph equipped with a "Carbosieve" column at 150° C. with sampling every 20° C. Continuous analysis was performed using a CO "Infared" gas analyzer. TABLE 3 gives the temperature (T50) at which 50% of the CO was oxidized by each sample.

TABLE 3

| Material of Step | Material Description | T50 (°C.) |
|---|---|---|
| A | 1% Pt + 0.1% Pd/2.5% ZrO$_2$—CeO$_2$ | 70 |
| B | 0.5% Pt + 1% Pd/2.5% ZrO$_2$—CeO$_2$ | 70 |
| C | 1% Pt/CeO$_2$ | 250 |
| D | 1% Pt/Al$_2$O$_3$ | 275 |

The results of TABLE 3 show that materials A and B, comprising catalyst materials in accordance with an embodiment of the invention, i.e., zirconia-stabilized ceria having both platinum and palladium catalytic components dispersed thereon, provide much higher activity than either of the comparative materials represented by materials obtained in steps C and D. A much lower operation temperature, 70° C., is required for the materials in accordance with present invention to effect conversion of 50 percent of the carbon monoxide than is required for the prior art materials represented by the materials of steps C and D.

EXAMPLE 4

A. A catalytic material was prepared according to the procedure of Step A of Example g but to provide a material which contained 2.5 percent by weight Ft plus 0.25 percent by weight Pd on a ceria powder stabilized with 2.5 weight percent zirconia. This material was blended with an activated alumina powder substantially comprising gamma alumina having a surface area of 130 m$^2$/g and a particle size such that at least about 50 percent of the particles had a diameter of not greater than 10 microns. The alumina powder, which served as a refractory binder, was mixed with the stabilized, catalyzed ceria powder in proportions such that the resultant blend, which was designated Catalyst 4A, contained 1.2g weight percent Pt and 0.125 weight percent Pd.

B. A sample of ceria stabilized with 2.5 percent by weight zirconia and having 2.5 percent by weight Pt dispersed thereon was prepared in accordance with the method of Example 3. A batch of the same unstabilized alumina material used in Part A of this Example 4 was impregnated to deposit 0.25 percent by weight palladium on it, using the procedure of the first part of Step A of Example 3. Equal amounts by weight of these two powder materials were blended to provide a material, which is designated Catalyst 4B, so that the blended powder contained the same precious metal content as Catalyst 4A, that is, Catalyst 4B contained 1.25 percent by weight Pt plus 0.125 percent by weight Pd. After aging and evaluation under the conditions as described in Step D of Example 3, the resulting materials were used as CO oxidation catalysts under the same conditions as described in Step D of Example 3, to determine the temperature at which 50% of the CO is oxidized, with the following results.

TABLE 4

| Catalyst | T50 °(C.) |
|---|---|
| 4A | 210 |
| 4B | 220 |

The results summarized in Table g show that the temperatures at which 50% conversion of carbon monoxide were attained with Catalyst 4A and with Catalyst 4B are very close to each other. This indicates that whether the platinum and palladium catalytic components are dispersed upon the same increments of ceria as is the case with Catalyst 4A, or on different supports which are then blended, as in Catalyst 4B, a substantially similar catalytic effect is attained.

EXAMPLE 5

A. A 2.5% zirconia-stabilized ceria powder was prepared as in Example 1, except that the final calcination temperature was 750° C. instead of 450° C. One thousand grams (1000 g) of this stabilized ceria was sequentially impregnate TM d with palladium and platinum solutions as described in Example 3, so as to give a material containing 1% Pt and 0.1% Pd. To reduce the particle size of the material, 980 g of the material were placed in a one-gallon ball mill with an appropriate grinding medium and 835 g of water was added. The material was ball milled for g hours at 60 rpm. One thousand grams (1000 g) of an activated alumina comprising gamma alumina having a surface area of 130 m$^2$/g was placed into a separate ball mill with an appropriate grinding medium, 1140 g of distilled water, and 60 ml of glacial acetic acid. This mixture was milled for 8 hours. The resulting two ball-milled slurries were combined in a proportion to provide an equal weight of solids of each slurry in the mixture, and was mixed for one hour. A cordierite monolithic substrate of rectangular configuration measuring 3.18 ×6.68×6.00 inches long (8.08 cm×16.97 cm×15.24 cm long) and having 400 cells per square inch (62 cells per square centimeter) of face area was coated with the mixed slurry. The coating was carried out by immersing the substrate into the slurry and blowing excess material from the channels of the substrate with pressurized air. The coated unit was dried at 100° C. and then calcined at 450° C. in air for 1 hour. The resulting catalyst body, which is denominated Catalyst 5A, had thereon a "washcoat" (the residue obtained by drying and calcining the slurry) loading of 1.60 g/in3. The precious metal (Pt and Pd) content was 15 g/ft3.

B. A commercial catalyst, prepared by a technique similar to that of Step A of this Example 5, uses the identical size and type of cordierite substrate as used in Step A. However the commercial catalyst, denominated Catalyst 5B, contained 20 g/ft3 of catalyst body of platinum and rhodium of precious metal, in a weight ratio of 5Pt:1Rh.

C. Both Catalysts 5A and 5B were aged for 300 hours on an engine dynomometer using gasoline fuel containing 4 mg per gallon Pb in a three-step cycle in which, for 7.8% of the time, the catalyst was exposed to temperatures of 850° C. whereas the temperatures were below 650° C. the remaining time. After this aging, the catalysts were evaluated by being installed in a 1985 Honda Accord having a four cylinder engine in place of the original catalyst and tested in accordance with the 1975 Federal Test Procedure ("FTP") using a gasoline fuel containing 4 mg per gallon Pb. The conversion efficiencies were calculated for the catalysts during the FTP by measuring the emissions before and after the catalyst for the total FTP test. These results are shown in Table 5.

TABLE 5

| Overall Conversion Efficiency % | Catalyst 5A (15 g/ft3, 10 Pt/1 Pd) | Catalyst 5B (20 g/ft3, 5 Pt/1 Rh) |
| --- | --- | --- |
| HC | 83 | 88 |
| CO | 73 | 83 |
| $NO_x$ | 56 | 78 |

Results of the tests as shown in Table 5 indicate that Catalyst 5A, a non-rhodium catalyst, has unusually high levels of activity compared to Catalyst 5B, a standard Pt/Rh TWC catalyst, for conversion of all three categories (HC, CO and NOx) of noxious components. Catalyst 5B had somewhat better activity, but it should be noted that it contained 25% more precious metals than Catalyst 5A.

EXAMPLE 6

A catalyst, denominated Catalyst 6A, was made as described in Part A of Example g using the same type of substrate as described therein, but to provide a loading of 35 g/ft3 of precious metal in a weight ratio of 10Pt/1Pd. This catalyst was compared to a conventional commercial TWC catalyst, denominated Catalyst 6B, comprising a substrate which was substantially identical to the substrate of Catalyst 6A and containing a washcoat comprising platinum and rhodium catalytic components dispersed on alumina, and further containing ceria and nickel. The commercial TWC catalyst comprising Catalyst 6B also contains nickel oxide (NiO), which serves in part as an $H_2S$ scavenger, and had a loading of 40 g/ft3 of precious metal, in a weight ratio of 5Pt:1Rh. The washcoat loading of Catalyst 6B was approximately 2.5g/cubic inch and the NiO loading was 0.1g/cubic inch. The aging was performed in a cycle similar to that of Example 5, except that the overall temperatures were 60° C. lower throughout the cycle. After 300 hours, the FTP evaluation showed the conversion efficiency results set forth in Table 6.

TABLE 6

| Overall Conversion Efficiency % | Catalyst 6A (35 g/ft3, 10 Pt/1 Pd) | Catalyst 6B (40 g/ft3, 5 Pt/1 Rh) |
| --- | --- | --- |
| HC | 89 | 91 |
| CO | 84 | 86 |
| $NO_x$ | 64 | 79 |

The results of Table 6 show that nearly equivalent HC and CO activity and slightly lower NOx activity are attained by Catalyst 6A as compared to the more expensive Catalyst 6B a Pt/Rh catalyst which contains 5 g/ft3 more precious metals overall than does Catalyst 6A.

Both virgin catalysts were evaluated for $H_2S$ emissions in a test in which the catalyst converters were run at a lambda setting of 0.93 on a Volvo engine dynomometer at 450° C. for 30 minutes to condition the catalysts. (The term or symbol "lambda" is conventionally used herein, to express the air to fuel weight ratio, referred to above as "A/F", in terms relative to the stoichiometric mixture for the specific fuel employed. Lambda is taken as being unity (1.0) at the stoichiometric A/F ratio for conversion of all the gasoline fuel to $CO_2$ and $H_2O$. Fuel-lean A/F ratios result in lambda being greater than 1.0. and fuel rich A/F ratios result in lambda being less than 1.0). In the test of Catalysts 6A and 6B, the controls were switched to a lean setpoint of lambda = 1.03 for 30 minutes for sulfur collection. When the catalyst was put under rich control conditions (lambda=0.93), $H_2S$ in the exhaust gas from the catalyst was measured using a commercially available chromatographic indicater tube sold under the trademark "Draeger". In Table 6A, the $H_2S$ emissions are shown in parts per million ("ppm") by volume for Catalyst 6A and Catalyst 6B at the indicated time intervals after switching to rich operation at lambda equal to 0.93, and at a temperature of 450° C. of the inlet gas to the catalysts.

TABLE 6A

| | $H_2S$ Emissions ppm | |
| --- | --- | --- |
| Time (mins.) | Catalyst 6A 35 g/ft³, 10 Pt/1 Pd | Catalyst 6B 40 g/ft³, 5 Pt/1 Ph |
| 0.08 | 40 | >60 |
| 1.08 | 35 | 53 |
| 1.58 | 21 | 40 |
| 5.0 | 20 | 30 |

The results of Table 6A show that Catalyst 6A, which contains no base metal scavenger, controls $H_2S$ emissions more effectively than Catalyst 6B. which contains NiO, which has an $H_2S$ scavenging effect.

EXAMPLE 7

Four batches of zirconia-stabilized ceria and four batches of lanthana-stabilized ceria were prepared as in Example 1, but with variations in the amount of stabilizing promoter used. Each of the stabilized ceria powders was impregnated with a platinum catalytic component as was done in Example 2, but to provide a constant platinum loading for each stabilized ceria powder, of 1.6% Pt. Each of these catalyst powders was aged in air at 750° C. for two hours, and the BET surface area was then measured by the standard nitrogen adsorption technique mentioned in Example 1. The results are shown in TABLE 7.

TABLE 7

| Stabilizer % by Weight | Surface Area (m²/g) Stabilizer | |
| --- | --- | --- |
| | $ZrO_2$ | $La_2O_3$ |
| 0.5 | 61 | 54 |
| 1.0 | 65 | 64 |
| 2.5 | 80 | 75 |
| 5.0 | 56 | 52 |

The results of TABLE 7 show that the stabilizing effect of the zirconia and lanthana stabilizing promoters increases with increasing percent by weight of the promoter up to at least 2.5 percent by weight, and that by the time the quantity of stabilizer is increased to about 5 percent by weight, the thermal stabilizing effect has decreased. Without intending to be bound by a particular theory, it is believed that excessive amounts of the zirconia and/or lanthana stabilizing promoter causes the "islands" of these materials to cover an increasingly large proportion of the available surface area of the ceria particles, thereby reducing the area available for the platinum catalytic component to disperse directly onto the ceria surface. The stabilizing effect of the platinum on the ceria is believed to be thereby reduced.

EXAMPLE 8

A catalyst in accordance with one embodiment of the present invention, designated catalyst 8A, having platinum and palladium catalytic components dispersed on a zirconiastabilized bulk ceria support, and having a rhodium catalytic component overcoat thereon was prepared as follows.

I. Base Washcoat

A. A zirconia-stabilized bulk cerium oxide powder containing 2.5 percent by weight $ZrO_2$ was prepared as described in Example 1. One thousand grams of the resulting material was placed in a mixing bowl. The water uptake of this material was determined to be 0.40 ml of water per gram of material. Accordingly, a monoethanolamine palladium acetate solution was diluted to 400 g with distilled water and the entire quantity was added drop-wise to the 1,000 grams of powder over 15 minutes while mixing the powder in a General laboratory mixer. The mixing was continued for 15 minutes to insure uniform impregnation of the powder with the palladium complex solution and, after mixing, the powder was transferred to a quartz boat in which it was dried at 100° C. for 16 hours. The result was a dried zirconia-stabilized ceria containing 0.56 percent by weight palladium catalytic component, measured as Pd.

B. A solution of monoethanolamine platinum hydroxide containing 22.4 g Pt was diluted with sufficient distilled water to provide 400 g of the diluted solution. The solution was deposited drop-wise onto the dried powder obtained from Step IA over a 15 minute period while mixing in a General laboratory mixer. The mixing was continued for 15 minutes to obtain uniform distribution of the platinum complex and the resultant impregnated powder was transferred to a quartz boat and dried at 100° C. for 16 hours. The dried material was then calcined at 450° C. in air for two hours to provide a zirconia-stabilized ceria powder containing 2.24 percent by weight Pt and 0.56 percent by weight Pd.

C. 980 g of the calcined powder obtained from Step IB was mixed with 835 g of distilled water in a one-gallon ball mill, together with an appropriate milling medium, and milled for 3 hours at 60 rpm.

D. One thousand grams of an activated alumina powder and 1140 g of distilled water were placed into a one-gallon ball mill together with an appropriate milling medium, and milled for 30 minutes. The alumina powder was a 130 $m_2/g$ surface area gamma alumina stabilized with a total of 3 percent by weight of a lanthana-rich rare earth oxide mixture and baria and having a particle size such that 50 percent of the particles had a diameter of not more than 10 microns. The milling was continued for 30 minutes. At the end of 30 minutes, 40 ml of glacial acetic acid was added to the ball mill and milling was continued for an additional 12 hours at 60 rpm.

E. Cordierite fines obtained by grinding recycled catalyst production scrap is mixed with 250 g of distilled water in a one-half gallon ball mill and milled for 12 hours at 60 rpm. A quantity of the slurry obtained from Step I.D containing 980 g by weight of stabilized alumina solids plus 112 g of solids from the recycled cordierite fines slurry of Step I.E are added to the ball mill containing the slurry of Step I.C. The resulting mixture is milled for one hour at 60 rpm to provide a slurry comprising a mixture of the platinum and palladium containing zirconia-stabilized ceria, stabilized alumina (as a refractory binder) and the recycled cordierite fines.

F. A cordierite monolithic substrate having 400 cells per square inch of face area is immersed into the slurry obtained from Step I E. the excess slurry is blown out of the fine gas flow channels with pressurized air, and the coated substrate is dried at 100° C. for 16 hours. The dried substrate is then calcined at 450° C. in air for one hour to provide a catalyst unit comprising a cordierite substrate having thereon a washcoat in an amount of 1.85 g of the washcoat per cubic inch of the unit.

11. Overcoat

A. Into a one-gallon ball mill, together with an appropriate milling medium, were added 1000 g of distilled water and 1000 g of an activated alumina comprising gamma alumina having a surface area of 95 $m_2/g$. The mixture is milled for 30 minutes, after which an amount of an aqueous monoethanolamine platinum hydroxide solution containing 3.16 g Pt is added to the ball mill, and ball milling is continued for two additional hours at 60 rpm. An aqueous solution of rhodium nitrate containing 16 g of Rh is then added to the ball mill and milling is continued for an additional 10 hours at 60 rpm to produce a particle size such that at least about 50 percent of the particles have a diameter not exceeding about 10 microns. A solution of zirconyl acetate containing the equivalent of 166.7 g of $ZrO_2$, plus sufficient distilled water to give a total solids content of 32 percent to the slurry, is added to the ball mill. (A solids content of 32 percent slurry means that 32 percent by weight of the weight of the slurry is provided by its solids content the balance comprising the aqueous solution.) The resultant slurry is milled for an additional two hours at 60 rpm.

B. The slurry obtained from Step II.A is applied to the catalyst unit obtained in Step I.F by dipping the unit into the slurry obtained in Step II.A and blowing excess slurry from the fine gas channels with pressurized air. The unit is then dried at 100° C. for 16 hours and thereafter calcined in air at 450° C. for one hour to provide a catalyst composition. The catalyst composition comprises a cordierite substrate having a first or base washcoat containing a zirconia-stabilized bulk ceria support having platinum and palladium catalytic components dispersed thereon, overlaid by a second or overcoat washcoat comprising a zirconia-stabilized gamma alumina having platinum amd rhodium dispersed thereon. The overcoat layer was applied in the amount of 0.7 g/in³ so as to give a total washcoat loading (base layer plus overcoat layer) of 2.5 g/in³ to the Catalyst 8A, which also has a total precious metal loading of 47g/ft³ comprising Pt, and Pd and Rh in a weight ratio of 11Pt/3Pd/1Rh. A reference catalyst, designated Catalyst 8B, was a commercial Pt/Rh TWC catalyst having the same total precious metal loading of 47g/ft$^3$ as Catalyst 8B, in a weight ratio of 14Pt/1Rh. Catalyst 8B also contained conventional washcoat components comprising alumina, stabilizers and ceria so as to give a total washcoat loading of 2.5g/in$^3$. The Pt in this catalyst was distributed over 0.7 g/in$^3$ of 2.5 weight percent alumina-stabilized ceria and 1.4 g/in$^3$ of gamma alumina having a surface area of 130 m$^2$/g. The rhodium was distributed on 0.36 g/in$^3$ of gamma alumina having a surface of 130 m$^2$/g. The resulting coated monolith was immersed in a barium acetate solution so as to give 0.08 g/in$^3$ BaO after calcination at 350° C. for one hour.

Catalysts 8A and 8B each were aged for 313 hours on an engine dynomometer using g mg Pb/gal fuel in a three-step cycle in which the catalyst inlet sees a maximum temperature of 785° C. for 38% of the time. An FTP evaluation as described in Example 5 was made by installing Catalysts 6A and 6B in turn in the exhaust system of a 1988 Oldsmobile Delta 88 having a 2.8 g liter engine. The results of the FTP evaluation are shown in Table 8.

TABLE 8

| Catalyst (Pt/Pd/Rh)* | HC | CO | NO$_x$ |
|---|---|---|---|
| 8A (11.4/2.6/1) | 87% | 74% | 72% |
| 8B (14/0/1) | 89% | 70% | 74% |

*Weight ratio

The data of Table 8 shows that Catalyst 8A provides catalytic activity comparable to that of Catalyst 8B, thereby indicating that Pd can be substituted for Pt in a Pt/Rh TWC catalyst without any deleterious effect upon activity.

As indicated by the above Examples, the platinum and palladium-containing catalysts of the present invention promote the oxidation of hydrocarbons and carbon monoxides in a manner comparable to that of the known platinum and rhodium-containing catalysts, and are about 80% as effective as the latter with respect to substantially simultaneously (with the oxidation reactions) promoting the reduction of nitrogen oxides over a relatively broad range of air to fuel ratios. At an A/F ratio of about 14.6 to 14.8, catalysis temperatures of, e.g., about 450°-550° C., and low mass flows, the platinum and palladium catalysts of the present invention provide three-wag conversion. i.e., oxidation of HC and CO and reduction of NOx, at a level comparable to that provided by the known platinum- and rhodium-containing catalysts. Since rhodium is much more expensive than either platinum or palladium, the catalysts of the present invention enjoy a significant most advantage and provide comparable three-way conversion at least under lean, high temperature operating conditions. Under different operating conditions, in certain circumstances, the reduced ability of the catalysts of the present invention to simultaneously promote the reduction of NOx while promoting the oxidation of HC and CO, may be acceptable because the catalysts of the present invention are, as noted above, about 80% as effective as the platinum-rhodium catalysts with respect to NOx reduction. If additional NOx reduction is required in a given case, the catalysts of the present invention may be supplemented by a catalyst which is effective for NOx reduction. Any suitable catalyst may be used for the purpose, for example, commercially available three way conversion catalysts may be so employed, either upstream or downstream (as sensed in the direction of flow of the gas being treated) of the catalysts of the present invention. In some circumstances it has been found to be advantageous to employ such supplemental NO$_x$ reduction catalysts upstream of the catalysts of the present invention. Accordingly, reference herein and in the claims to "first" and "second" catalyst compositions does not necessarily indicate the order in which the gaseous stream being treated is flowed through the catalyst compositions. Because the catalysts of the present invention are capable of converting about 80% as much of the NOx as the platinum-rhodium catalysts, the supplemental NOx reduction catalysts used in conjunction with the catalysts of the present invention may be quite small in size. Accordingly, the cost of such an arrangement, i.e., the combination of a catalyst the present invention with a small supplemental NOx catalyst, may prove to be less expensive than a conventional platinum-rhodium catalyst.

What is claimed is:

1. A catalyst composition comprising a carrier on which is disposed a catalytic material comprising: (a) a bulk ceria support, stabilized against thermal degradation (b) a catalytically effective amount of a platinum catalytic component dispersed on the ceria support, (c) a catalytically effective amount of a palladium catalytic component, and (d) a refractory binder; the platinum and palladium catalytic components being present in quantities to provide in the catalytic material a platinum to palladium weight ratio of from about 50:1 to 1:50, measured as the metals.

2. The catalyst composition of claim 1 wherein the bulk ceria support contains one or both of a zirconia stabilizer and a lanthana stabilizer.

3. The catalyst composition of claim 1 or claim 2 wherein the refractory binder comprises alumina.

4. The catalyst composition of claim 1 or claim 2 wherein the palladium catalytic component is also dispersed on the bulk ceria support.

5. The catalyst composition of claim 4 wherein the platinum and the palladium catalytic components are dispersed on the same increments of bulk ceria.

6. The catalyst composition of claim 3 wherein the ceria contains the zirconia stabilizer.

7. The catalyst composition of claim 1 or claim 2 wherein at least a portion of the refractory binder is provided by an activated alumina support on which the palladium catalytic component is dispersed.

8. The catalyst composition of claim 1 or claim 2 wherein at least a portion of the refractory binder is provided by an activated alumina support, and further including a rhodium catalytic component dispersed on the alumina support.

9. The catalyst composition of claim 8 wherein the activated alumina support having the rhodium catalytic component dispersed thereon is present as an overcoat layer on at least part of the catalyst composition.

10. The catalyst composition of claim 1 or claim 2 wherein the total weight of the platinum and palladium catalytic components, measured as the metals, comprises from about 0.1 to 3.0 percent by weight of the total weight of the catalytic material.

11. A catalyst composition comprising a carrier on which is disposed a catalytic material comprising: (a) a bulk ceria support containing one or both of a zirconia stabilizer and a lanthana stabilizer, (b) a platinum catalytic component dispersed on the ceria support, (c) a palladium catalytic component, and (d) a refractory binder; the platinum and palladium catalytic components being present in quantities to provide (i) a platinum to palladium weight ratio of from about 50:1 to 1:50, measured as the metals, and (ii) a total weight of the platinum and palladium catalytic components of from about 0.1 to 3.0 percent by weight of the total weight of catalytic material, measured as the metals.

12. The catalyst composition of claim 11 wherein the palladium catalytic component is dispersed on the ceria support.

13. A catalyst composition comprising a carrier on which is disposed a catalytic material, the catalytic material comprising: (a) a bulk ceria support containing one or both of a zirconia stabilizer and a lanthana stabilizer, (b) a catalytically effective amount of one or more catalytic components dispersed on the ceria support and comprising platinum and palladium catalytic components, and (c) a refractory binder.

14. The catalyst composition of claim 11, claim 12 or claim 13 wherein the refractory binder comprises alumina.

15. The catalyst composition of claim 11, claim 12 or claim 13 wherein the ceria contains the zirconia stabilizer.

16. The catalyst composition of claim 11 wherein the platinum and the palladium catalytic components are dispersed on the same increments of bulk ceria.

17. A catalyst assembly for treating a gaseous stream containing both oxidizable and reducible gaseous pollutants, the catalyst assembly comprising:
(a) a first catalyst composition comprising a first carrier on which is disposed a catalytic material, the catalytic material comprising (i) a bulk ceria support containing one or both of a zirconia stabilizer and a lanthana stabilizer. (ii) a catalytically effective amount of a platinum catalytic component dispersed on the ceria support, (iii) a catalytically effective amount of a palladium catalytic component, and (iv) a refractory binder; the platinum and palladium catalytic components being present in quantities to provide in the catalytic material a platinum to palladium weight ratio of from about 50:1 to 1:50, measured as the metals;
(b) a second catalyst composition comprising a catalyst effective for the reduction of nitrogen oxides, and carried on a second carrier; and
(c) an enclosure means within which the first catalyst composition and the second catalyst composition are mounted for series flow therethrough of the gaseous stream to be treated.

18. The catalyst assembly of claim 17 wherein the ceria contains the zirconia stabilizer.

19. The catalyst assembly of claim 17 or claim 18 wherein the palladium catalytic component of the first catalyst composition is also dispersed on the ceria support.

20. The catalyst assembly of claim 19 wherein the platinum and the palladium catalytic components are dispersed on the same increments of bulk ceria.

21. The catalyst assembly of claim 19 wherein the refractory binder of the first catalyst composition comprises alumina.

22. The catalyst assembly of claim 17 or claim 18 wherein at least a portion of the refractory binder of the catalytic material of the first catalyst composition is provided by an activated alumina support on which the palladium catalytic component is dispersed.

* * * * *